United States Patent [19]

Okada et al.

[11] Patent Number: 4,873,145

[45] Date of Patent: Oct. 10, 1989

[54] RESIN-COATED AGGREGATES

[75] Inventors: Takeji Okada, Yokohama; Minoru Sawaide, Narashino; Minoru Imai, Yokohama; Daisuke Tachibana, Tokyo, all of Japan

[73] Assignee: Shimitzu Construction Co., Ltd., Tokyo, Japan

[21] Appl. No.: 935,182

[22] Filed: Nov. 26, 1986

Related U.S. Application Data

[63] Continuation-in-part of Ser. No. 738,603, May 28, 1985, abandoned.

[30] Foreign Application Priority Data

May 31, 1984 [JP] Japan .................................. 59-111609
May 31, 1984 [JP] Japan .................................. 59-111610

[51] Int. Cl.$^4$ ............................ C04B 7/02; B05D 7/00
[52] U.S. Cl. ....................................... 428/407; 106/97; 166/280; 427/214; 427/221; 428/403
[58] Field of Search ........................ 428/407, 403, 404; 166/280; 427/214, 215, 221; 523/200; 106/97

[56] References Cited

U.S. PATENT DOCUMENTS

| | | | |
|---|---|---|---|
| 3,551,274 | 12/1970 | Shannon | 161/168 |
| 4,221,829 | 9/1980 | Vargiu et al. | 427/222 |
| 4,430,459 | 2/1984 | Akerberg et al. | 523/144 |
| 4,518,039 | 5/1985 | Graham et al. | 166/276 |
| 4,585,064 | 4/1986 | Graham et al. | 166/276 |

FOREIGN PATENT DOCUMENTS 2158818 11/1985 United Kingdom ................ 523/205

OTHER PUBLICATIONS

JIS-A-5002-1978 Japanese Industrial Standard Light Weight Aggregates for Structural Concrete; Translated and Published by Japanese Standards Association.
Mesalite, Expanded Shale Light Weight Aggregate, Mitzui Mining & Smelting Co., Ltd.

*Primary Examiner*—George F. Lesmes
*Assistant Examiner*—J. Monroe
*Attorney, Agent, or Firm*—Hoffmann & Baron

[57] ABSTRACT

A substantially water-resistant resin-coated aggregate for use in concrete includes a porous aggregate body, such as an artificial light weight aggregate, with an elastic layer made of a phenol resin elastomer deposited on the aggregate body, a rigid phenol resin coated on the elastic covered aggregate body. This resin-coated aggregate has a high water absorption prevention and further an external stress-damping function.

12 Claims, No Drawings

RESIN-COATED AGGREGATES

This is a continuation-in-part of copending application Ser. No. 738,603 filed on May 28, 1985, now abandoned.

BACKGROUND OF THE INVENTION

This invention relates to resin-coated aggregates having a very low water absorbability, and further, if necessary, having a good stress-damping function.

Recently, artificial light weight aggregates (ALG) have been widely used as aggregates in light weight concretes owing to their light weight property. ALG is porous light weight aggregates prepared by firing shale, etc., as main raw materials.

On the other hand, ALG has a high water absorbability owing to its porous property and absorbs water during the mixing of concrete. Thus, it is necessary to prevent changes in the flowability of concrete. To this end, water content control must be thoroughly carried out before or during the mixing of concrete. Thus, the concrete mixing work becomes complicated or the resulting concrete is liable to undergo freezing damage.

To improve the water absorbability of ALG, it has bee already proposed to coat the surface of the aggregates with asphalt. However, there is still a problem that the asphalt-coated aggregates absorb water when subjected to a pressure of more than 10 atmospheres applied during the pumping of a light weight concrete containing the asphalt-coated aggregates, owing to the unsatisfactory strength, adhesion, etc. of the asphalt coating. That is, the asphalt-coated aggregates have an unsatisfactory effect on the water absorption prevention.

Furthermore, ALG has a poor resistance to an external stress owing to its porous property, and is liable to undergo rapid fatigue breakage due to repeated external stresses.

Not only ALG but also natural aggregates having a high water absorbability suffer form these problems.

An object of the present invention is to overcome these problems and to provide aggregates having a good effect on water absorption prevention, in which no water-absorbing phenomena take place even if exposed to a high pumping pressure.

Another object of the present invention is to provide aggregates having a function to absorb and damp any external stress in addition to its resistance to water absorption.

According to a first aspect of the present invention, the present aggregates comprise porous aggregates, at least whose surfaces are coated with a rigid phenol resin.

According to a second aspect of the present invention, there is provided a resin-coated aggregate comprising a porous aggregate body, an elastic layer made of a phenol resin elastomer deposited on the aggregate body, and a rigid phenol resin coated on the elastic covered body.

SUMMARY OF THE INVENTION

The present invention is a substantially water-resistant resin-coated aggregate for use in concrete which includes a porous aggregate body and a water-resistant coating made up of a rigid phenol resin coated on the porous aggregate body. The coating is preferably a reaction product of a novolak-type phenol resin and hexamethylenetetramine.

The porous aggregates are low in moisture and should have a water content of not more than about 5% by weight. While the porous aggregates can be either artificial light weight aggregates or natural porous aggregates, it is preferable that they are artificial light weight aggregates having a water content of no more than about 0.1% by weight and are prepared for coating by air cooling of the aggregates after firing. Furthermore, the rigid coating preferably has a thickness of only from about 20 to about 50 μm.

In another aspect of the invention, the aggregates are not only water-resistant but are damped against stress by use of an elastic layer made of a phenol resin elastomer deposited directly on the aggregate body and covered thereover by a water-resistant layer made, once again, of a rigid novolak-type resin coated on the elastic layer. In this second most preferred embodiment, the phenol resin elastomer is a novolak-type, rubber-modified phenol resin which is a reaction product of novolak with a rubber component such as acrylonitrile rubber which is then cured with an epoxy resin. The elastic layer preferably has a thickness of from about 30 to about 70 μm, and a JIS rubber elasticity of from about 70 to about 85.

In order to obtain the discretely coated aggregates, the resin coating with regard to the first embodiment of the invention can be prepared by curing the rigid phenol resin coating at a temperature of from about 100° to about 180° for a time of from about 3 to about 10 minutes while in a fluidized state thereby coating the discrete particles of the aggregate. Preferably the rigid phenol resin curing temperature can be about 165° C. while the curing time can be about 4 minutes.

When the aggregates are coated with both the phenol resin elastomer and the rigid phenol resin, the elastomer can be cured on the discretely coated particles at a temperature of from about 150° C. to about 180° C. for a time of from about 2 to about 10 minutes in a fluidized state once again to obtain discretely covered particles of aggregate having an elastomeric coating thereon. Subsequently, the once coated particles can then be subjected to the rigid phenol resin which is deposited on the cured elastic layer and then cured at a temperature of from about 150° C. to about 180° C. for a time of from about 3 to about 10 minutes while in a fluidized state preferably these two coating steps to provide the two layers can be performed at a curing temperature of 170° C. for about 3 minutes for the elastomeric layer while the rigid phenol resin curing temperature is preferably about 165° C. and the curing time is about 4 minutes.

For a better understanding of the present invention, together with other and further objects, reference is made to the following description, and its scope will be pointed out in the appended claims.

DETAILED DESCRIPTION OF THE INVENTION

The aggregates for use in the present invention include artificial light weight aggregates (ALG), defined according to JIS-A-5002, titled "Aggregates for structural lightweight concrete." ALG having a lower water content is preferably. For example, ALG in a dry state, which contains not more than 5% by weight of water, is preferable. To this end, ALG containing about 0.1% by weight of water, prepared by air cooling of ALG after the firing is more preferable. It is needless to say that natural, porous aggregates can also be used as the aggregate body.

According to the first aspect of the present invention, the aggregates are coated with a rigid phenol resin. Any of rigid thermosetting phenol-formaldehyde resins can be used as the rigid phenol resin, but a novolak-type phenol resin is preferable because of less foaming during the curing. The novolak-type phenol resin is a kind of phenol resin produced by causing hexamethylenetetramine to react with novolak. This novolak-type resin is thermosetting and generally rigid, and has good strength and chemical resistance. In addition, the novolak is a reaction product of phenol and formaldehyde made with an acidic curing agent in the reaction. The thickness of phenol resin coating layer is usually 20 to 50 $\mu$m. Below 20 $\mu$m, the resulting coating layer has not enough coating strength and no satisfactory effect on water absorption prevention is obtained, whereas, above 50 $\mu$m, the coating layer is too thick to be economical since there is no expected increase in the water-resisting effect. The rigid phenol resin coating layer must cover at least the surfaces of the aggregates completely in a state free from cracks, pinholes, etc. The rigid phenol resin may fill portions or all of the pores in the porous aggregates, and the pore filling can greatly improve the adhesion of the coating layer to the surfaces of the aggregate body.

According to the second aspect of the present invention, the aggregate body is directly coated with an elastic layer made of phenol resin elastomer. The elastic layer performs the main function of damping stresses. The phenol resin elastomer for use in the present invention includes novolak-type, rubber-modified phenol resin, prepared by reaction of novolak with a rubber component such as acrylonitrile rubber, etc., and by curing with an epoxy resin. The thickness of the first layer made by the phenol resin elastomer is usually 30 to 0 $\mu$m. Below 30 $\mu$m, the thickness of the first layer is not satisfactory, and the desired stress-damping effect can not be obtained, whereas, above 70 $\mu$m, no increase in the effect is expected, and, thus, is not economical. It is preferable that the elastic layer have a good rubber elasticity and a rubber hardness of 70 to 85 (JIS) when laid on the surfaces of the aggregates. The elastic layer must cover at least the surfaces of the aggregates completely in a state free from cracks, pinholes, etc. The phenol resin elastomer may fill portions or all of the pores in the porous aggregates, and the pore filling can greatly improve the adhesion of the first layer to the surfaces of the aggregates.

The elastic layer made of the phenol resin elastomer is further coated with a water-resistant layer made of a rigid phenol resin. The water-resistant layer performs the main function of preventing water absorption. The rigid phenol resin for use in the water-resistant layer must preferably have a good compatibility with a high adhesion to the phenol resin elastomer of the elastic layer, and less foaming during the curing. To this end, a novolak-type phenol resin is usually used. The thickness of the second layer is usually 20 to 50 $\mu$m. Below 20 $\mu$m, the resulting coating layer does not have enough coating strength and satisfactory effect on water absorption prevention is not attained, whereas, above 50 $\mu$m, no increase in the effect on water absorption prevention can be obtained, and, thus, is not economical. The water-resistant layer must cover the surface of the first layer completely in a state free from cracks, pinholes, etc.

A process for preparing the present aggregates will be described below.

Porous, water-absorbable aggregates are heated to a temperature of 110° C. to 140° C. and dried in advance to make the water content not more than 5% by weight. When artificial light weight aggregates having a water content of about 0.1% by weight, prepared by air cooling after the firing, as described before, are available, said drying step can be omitted. When the aggregates have a high water content, the aggregates coated with the rigid phenol resin as a single layer, or even with phenol resin elastomer and a rigid phenol resin as double layers, there is a danger of damage due to freezing.

Separately, a solution of phenol resin elastomer in an uncured state and a solution of phenol resin in an uncured state are made available. An example of the solution of phenol resin elastomer is a solution of novolak-type, rubber-modified phenol resin obtained by the reaction of novolak with acrylonitrile rubber, as described before, and an epoxy resin as a curing agent in an appropriate solvent, with a solid content of 10 to 60% by weight. An example of the solution of novolak resin is a solution of novolak resin with a solid content of 10 to 60% by weight, prepared by dissolving soluble novolak resin in an organic solvent such as alcohol, etc., and adding thereto 10 to 15% by weight of hexamethylenetetramine.

According to said first aspect of the present invention, the aggregates in the dry state are dipped in the phenol resin solution for a predetermined time, and then taken out therefrom, and heated at a temperature of 100° to 180° in a fluidized state for 3 to 10 minutes to cure the uncured resin attached to the aggregates and to form a rigid phenol resin coating on the aggregates. The thickness of coating layer, i.e., the water-resistant layer, depends on the dipping time in the resin solution, and the temperature, concentration, viscosity, etc. of the resin solution, and thus the desired thickness can be obtained by proper selection of these factors. Permeation of the resin solution into the pores of the aggregates also depends on the similar factors, and, thus, the amount of the resin to be filled in the pores can be likewise adjusted. In this manner, the desired aggregates coated with the phenol resin can be obtained.

The phenol resin for the water-resistant layer has high mechanical strength and a good adhesion to the aggregates, and thus can form a strong water-proof film on the surfaces of aggregates, rendering the water absorbability of the aggregates substantially zero. Furthermore, the rigid phenol resin coating is so strong that it will not be broken even under a high pressure, and no water-absorbing phenomena of the aggregates take place even during the high pressure pumping. Still furthermore, the rigid phenol resin has good low temperature characteristics. Thus, the strong water-proof film can be maintained even at a low temperature, resulting in no increase in the water absorbability at the low temperature and no consequent reduction in the cold weathering resistance of the aggregates.

According to said second aspect of the present invention, the aggregates in the dry state are dipped in the phenol resin elastomer solution for a predetermined time, and then taken out therefrom, and heated at a temperature of 150° to 180° C., preferably 170° C. in a fluidized state for 2 to 10 minutes, preferably 3 minutes, to cure the uncured resin attached to the aggregates and form an elastic layer of phenol resin elastomer on the aggregates. The thickness of the elastic layer depends on the dipping time in the resin solution, and the temperature, concentration, viscosity, etc. of the resin solution, and thus the desired thickness can be obtained by proper selection of these factors. Permeation of the resin solution into the pores of the aggregates also depends on the similar factors, and, thus, the amount of the resin to be filled in the pores can be likewise adjusted.

Then, the aggregates provided with the first layer on the surfaces are dipped in the phenol resin solution for a predetermined time, and then taken out therefrom, and heated at a temperature of 150° to 180° C., preferably 165° C., in a fluidized state for 3 to 10 minutes, preferably 4 minutes, to form a water-resistant layer of rigid phenol resin. The phenol resin solution used in this step is the same solution prepared by dissolving novolak in an organic solvent and adding thereto hexamethylenetetramine. The thickness of the water-resistant layer can be adjusted in the same manner as in the adjustment of the first layer. In this manner, the desired aggregates coated with a first layer of phenol resin elastomer and a second layer of rigid phenol resin thereon can be obtained.

The phenol resin elastomer for the first layer is highly elastic and adhesive to the aggregates, and thus a highly elastic film can be integrally formed on the surfaces of aggregates, and an external stress, even if applied to the aggregates, can be absorbed by the first layer to damp the stress on the aggregates proper.

The rigid phenol resin for the second layer has a high mechanical strength and a good adhesion to the elastic layer, and thus can form a strong water-proof film on the surfaces, rendering the water absorbability of the aggregates substantially zero. Furthermore, the water-resistant layer is so strong that it will not be broken even under a high pressure, and no water-absorbing phenomena of the aggregates take place even during the high pressure pumping.

Still furthermore, the phenol resin elastomer and the phenol resin have good low temperature characteristics. Thus, the stress-damping function and water absorption-preventing function can never be lowered even at a low temperature, and a high reliability can be obtained even if the present aggregates are used at a low temperature.

The function and effect of the present invention will be described in detail below, referring to the Example.

EXAMPLE

Artificial light weight aggregates Mesalite (trademark), a product having the water content of 0.1% and the specific gravity of 1.28, prepared by air cooling, were dipped in a resin solution, prepared by dissolving 3 parts by weight of hexamethylenetetramine in 100 parts by weight of a 30 wt.% novolak in alcohol, for 2 minutes, and then taken out, and heated at 170° C. in a fluidized state for 5 minutes to cure the resin and form a rigid phenol rein coating thereon. The amount of the coating was 1.5% by weight on the basis of the aggregate. The artificial light weight aggregates coated with the phenol resin were then dipped in water at 20° C. for 30 minutes, and subjected to measurement of water absorbability of the resulting aggregates under the changing pressures by pressurizing the water. The results are shown in the following table.

TABLE

| pressure (atm.) | water absorbability (%) |
| --- | --- |
| 1 | 0.0 |
| 20 | 0.2 |
| 40 | 0.2 |
| 80 | 0.4 |
| * | 7.5 | where "*" shows the water absorbability of ordinary artificial light weight aggregates (uncoated) under the atmospheric pressure.

It will be seen from the Table that the present resin-coated aggregates undergo no substantial water absorption even under high pressures, and thus have a good water-proof property.

As described above, the present resin-coated aggregates have a rigid phenol resin coating layer, i.e., a strong water-proof film, at least at the outer surfaces, and, thus, no water absorption phenomena occur during the storing or mixing of concrete thereby eliminating the need for water control work, and eliminating changes or loss of flowability during the mixing of concrete. Furthermore, the coating is not broken even under a high pressure, and thus a concrete mixture capable of withstanding a high pressure pumping can be obtained, resulting in shortening of the pumping time or increasing of pumping head. Still furthermore, the water content of the present aggregates can be kept low for a long time, and thus the ultimate concrete never undergoes freezing damage or water damage, and can be used in concrete structures in the cold lands.

Furthermore, the present resin-coated aggregates can have an elastic phenol resin elastomer layer as an intermediate layer between the surface of aggregate and the outer phenol resin coating layer, and thus an external stress on the aggregates is absorbed and damped by the intermediate elastic layer, thereby reducing the stress on the aggregates proper. That is, even if repeated stress such as waves, etc. are applied onto a concrete structure containing the present resin-coated aggregates for a long time, the external forces on the aggregates are reduced, and the time to the fatigue breakage can be much prolonged with increased reliability. The present resin-coated aggregates can be produced in a simple manner without any special production facility, and the production cost can be thus lowered.

We claim:

1. A substantially water-resistant resin coated aggregate for use in concrete comprising a porous aggregate body and a water-resistant layer having a thickness of from about 20 to about 50 μm made of a mechanically strong phenol resin coated on said porous aggregate body, said porous aggregate body selected from the group consisting of artificial light weight aggregates and natural light weight aggregates said mechanically strong phenol resin comprising a reaction product of novolak and hexamethylenetetramine.

2. The resin-coated aggregate of claim 1 which is prepared by curing said resin at a temperature of from about 100° to about 180° C. for a time of from about 3 to about 10 minutes in a fluidized state, whereby discrete coated aggregate bodies are provided.

3. The resin-coated aggregated of claim 1 wherein said porous aggregate body is in a dry state having a water content of not more than 5% by weight.

4. The resin-coated aggregate of claim 1, wherein said porous aggregate body comprises an artificial light weight aggregate prepared by air cooling of the aggregate after firing, and having a water content of about 0.1% by weight.

5. A substantially water-resistant and stress-damped resin-coated aggregate for use in concrete comprising a porous aggregate body having an elastic layer made of a phenol resin elastomer deposited on said aggregate body and a water-resistant layer having a thickness from about 20 to about 50 μm made of a mechanically strong phenol resin coated on said elastic covered porous aggregate body said phenol resin elastomer comprising a novalak, rubber-modified phenol resin which is a reaction product of novolak with a rubber component, said mechanically strong phenol resin comprising a reaction product of novolak and hexamethylenetetramine.

6. The substantially water-resistant and stress-damped resin-coated aggregate of claim 5 wherein said elastic layer has a thickness of from about 30 to about 70 μm, and a JIS rubber, elasticity of from about 70 to about 85.

7. The substantially water-resistant, and stress-damped resin-coated aggregate of claim 5 which is prepared by curing said phenol resin elastomer deposited on said aggregate body at a temperature of from about 150° C. to about 170° C. for a time of from about 2 to about 10 minutes in a fluidized state, whereby discrete particles having an elastic coating are formed on which a solution comprising said mechanically strong resin is deposited and cured at temperature of from about 150° C. to about 180° C. for a time of from about 3 to about 10 minutes in a fluidized state.

8. The substantially water-resistant and stress-damped resin-coated aggregate of claim 7 which is prepared by curing said phenol resin elastomer curing temperature is about 170° C. and the curing time is about 3 minutes, and wherein said mechanically strong phenol resin curing temperature is about 165° C. and said curing time is about 4 minutes.

9. The substantially water-resistant and stress-damped resin-coated aggregate of claim 5 wherein said aggregate body is in a dry state having a water content of not more than 5% by weight.

10. The substantially water-resistant and stress-damped resin-coated aggregate of claim 5 wherein said porous aggregate body comprises artificial light weight aggregates or natural porous aggregates.

11. The substantially water-resistant and stress-damped resin-coated aggregate of claim 10 wherein said porous aggregate body comprises artificial light weight aggregates having a water content of about 0.1% by weight, prepared by air cooling of the aggregates after firing.

12. The substantially water-resistant and stress-damped resin-coated aggregate of claim 5 wherein said rubber component is acrylonitrile rubber and wherein said reaction product is cured with an epoxy resin.

* * * * *